Oct. 20, 1959    J. F. SCHOEPPEL ET AL    2,909,064
MEANS FOR SUPPORTING A GYROSCOPE GIMBAL
Filed June 16, 1955
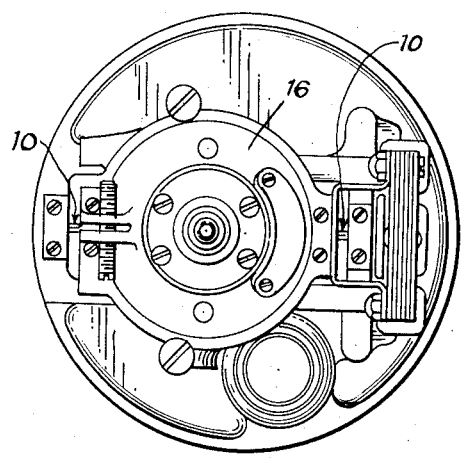
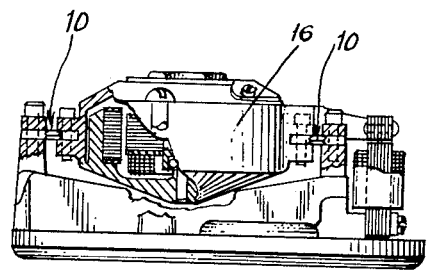
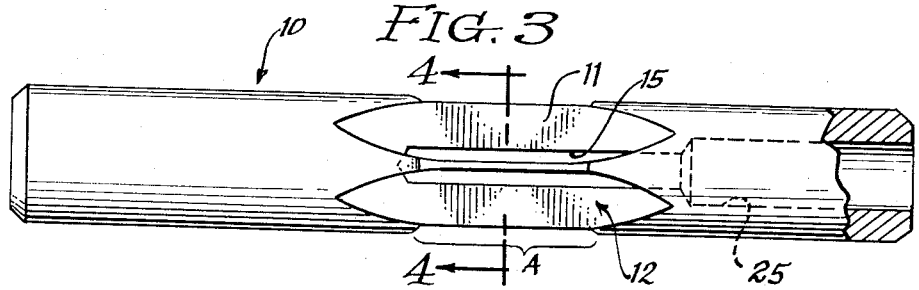
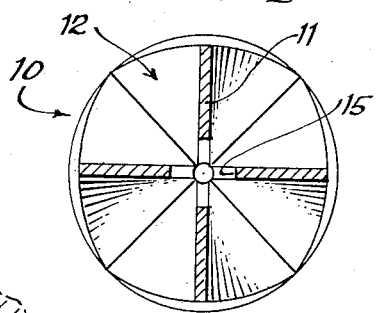
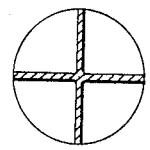
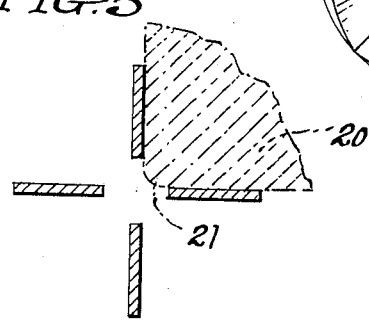
INVENTORS
John F. Schoeppel
BY David L. Critoph
Leonard A. Churfeld
Attorney

United States Patent Office 2,909,064
Patented Oct. 20, 1959

2,909,064

MEANS FOR SUPPORTING A GYROSCOPE GIMBAL

John F. Schoeppel and David I. Critoph, Grand Rapids, Mich., assignors to Lear, Incorporated, Grand Rapids, Mich.

Application June 16, 1955, Serial No. 515,913

8 Claims. (Cl. 74—5)

This invention relates to an improved support for mounting a gimbal of a gyroscope on a fixed frame or other gimbal with respect to which the first gimbal is to have a limited degree of angular movement.

In a gyroscope employed for measuring the rate of angular displacement of a craft during a turn, e.g., the rate of turn of an aircraft, the angular excursion of the gimbal is desirably only a few degrees and is effected against a rather stiff restraint. For meeting this requirement it has been known to support the gimbal on its frame through the medium of a pair of so-called torsion bars which are simply short rods of appropriate dimensions and modulus of elasticity to permit the required angular displacement of the gimbal under a predetermined range of displacing force, but which are relatively insensitive to deformation perpendicularly to the axis of rotation, herein referred to for convenience as "lateral stiffness."

It has been found that the use of a support of simple, circular cross section which is sufficiently small to provide the angular displacement is too flexible with respect to laterally applied forces while one which is large enough to possess sufficient lateral stiffness becomes too stiff for torsional deformation over the desired range. In connection with the foregoing it will be understood that the signal derived from a rate gyroscope should be a pure function of displacement of the rotor axis in a plane normal to the supporting axis and should be unaffected by displacements in the other two orthogonal planes.

The instant invention has for its principal object the provision of a one-piece member for supporting the gimbal of a gyroscope, for example, a rate gyroscope upon a frame or other part with reference to which angular displacement of the rotor axis in a definite plane is to be measured and which is torsionally deformable about an axis normal to that plane but virtually completely resistant to deformation in other planes.

Another object resides in providing a support as aforesaid which is reproducible with high accuracy as a production part.

Other objects and advantages will become apparent from the following description which, taken with the accompanying drawing, discloses a preferred form which our invention may assume in practice.

In this drawing:

Fig. 1 shows a top plan view of a rate gyroscope incorporating the invention;

Fig. 2 is a front elevational view thereof, partly in section;

Fig. 3 is a somewhat magnified view of one of the supports in accordance with the invention;

Fig. 4 shows a cross section taken on the line 4—4 of Fig. 3;

Fig. 5 is a somewhat simplified version of Fig. 4 to emphasize essential features of the support; and Fig. 6 shows a transverse cross section of a modified form of support.

Generally regarded the member comprising the invention is a rod of cylindrical or other cross section adapted to clamping of the same in its end supports and conformed over a mid-portion of its length to a preferably cylindrical, accurate cross section and notched in a plurality of longitudinally-extending sectoral zones to define an equal plurality of radial fins capable of deforming under a rotational force but comparatively rigid with respect to forces at right or essentially at right angles, to the axis. Where in this description and in the claims we refer to comparative compliance of the support as between rotational forces and radially-applied forces it is intended that the comparison is valid only with respect to a particular support and a particular gyroscope and the performance specifications thereof, and that the dimensions, material and elasticity of the support are to be determined by design and experiment in connection with the parent gyroscope. In the example to follow, dimensions and other data will be related to a gyroscope having specific characteristics.

Turning to the drawing a typical support comprises a bar 10 of steel and is intended for use in pairs in connection with the rotor case 16 of a rate gyroscope having 3° of clockwise and counterclockwise rotational deflection, corresponding to a rate of turn of the aircraft of 30° per second and employing a rotor of angular momentum 250,000 gm./cm.$^2$/sec. Thus the exemplificative support will have a spring rate per degree of rotation of 22±3 gm./cm., and a hysteresis factor not in excess of one part in 1000 for ±3° rotational displacement. A support having the foregoing characteristics is shown in Figs. 3 to 5 and has effective diameter extending over a distance indicated by the letter A. To provide the same a cylindrical rod of 0.125 inch is reduced in diameter over a length of 0.187″ to 0.118″ either prior to or following formation of the cruciform transverse cross section to be described.

To achieve the desired plurality of longitudinally extending integral fins 11, in this case four in number spaced 90° apart, four substantially sectoral zones 12 are removed from the rod, as by grinding with a wheel 20 having a 90° V-edge (Fig. 5) while the part is supported in a suitable fixture. The operation is performed to leave four fins each 0.0045 inch in thickness.

Inasmuch as the corner 21 of the grinding wheel may not, in practice, be maintained to some predetermined radius at its apex the four corners at the root of each of the zones 12 may vary between themselves and from one part to another, whereby variation in performance inevitably results. To avoid this difficulty we prefer to bore out the center of the support, as at 15, to a diameter of 0.031 inch, to provide a relief zone for the grinding wheel adjacent the axis. Thus a reasonable variation in the contour of the corner of the wheel may be tolerated without the same being reflected in the finished part. In order to minimize drill breakage it is preferred to bore a larger hole 25 and then to follow with the smaller bore 15. Should the specifications be less rigid the central bore 15 may be omitted. (Fig. 6.)

It will be noted that by means of the steps described, namely, the provision of a central bore 15, grinding of the several fins 11 to a specified thickness and grinding of the section A there may be obtained, in a solid rod of small diameter a plurality of integral fins of exact rectangular transverse cross section. By combining these steps with proper standards of material selection and heat treatment it is possible to produce supports in accordance with the invention which may vary only inconsequentially from the desired specifications.

A preferred material is chrome-vanadium steel (SAE6150) heat treated to a hardness of Rockwell 40–45 (Scale C) in accordance with the following schedule:

(1) Heat to 1525° to 1575° F. in a neutral chloride salt bath and hold at heat until part is at temperature throughout.

(2) Soak at heat for 5 minutes.

(3) Isothermal quench at 650° to 700° F. for 10 minutes in a bath of molten nitrate.

(4) Remove from nitrate bath and air cool.

(5) Clean part.

Torsionally compliant supports in accordance with the foregoing description have been found ideally adapted to the mounting of the gimbal of a rate gyroscope as used, for example, in providing an electrical signal corresponding to the rate of turn of an airplane where the force acting normally to the axis of the support may be due to an acceleration as high as 20 G's. Stated otherwise, lateral rigidity is such that the output signal may be regarded as directly due to rotational deformation of the supports.

While we have shown a particular embodiment of our invention, it will be understood, of course, that we do not wish to be limited thereto since many modifications may be made and we therefore contemplate by the appended claims to cover any such modifications as fall within the true spirit and scope of our invention.

We claim:

1. Means for supporting the rotor case of a gyroscope with respect to a fixed frame to provide a limited range of rotational movement of said case and virtually infinite resistance to translational displacement of the case, comprising a rod having a plurality of axially extending fins and means on said case and frame for clampingly receiving the respective ends of said rod.

2. An element in accordance with claim 1 wherein said fins are of thin, flat, transverse cross-section.

3. An element in accordance with claim 2 wherein said fins are positioned in radially-extending planes.

4. An element in accordance with claim 1 wherein said rod is provided with an axial bore at least coextensive with the axial extent of the fins.

5. In combination, a gyroscope rotor casing, a fixed frame adjacent to said casing, and a rod having a cruciform transverse cross-section over a predetermined length thereof and bounded at each end by a cylindrical portion, said casing and frame each having means for clampingly receiving the respective ends of the element to thereby provide a limited range of rotational movement of the casing and virtually infinite resistance to translational displacement of the casing.

6. A device in accordance with claim 5 further characterized by the provision of an axial bore extending over at least the length of the cruciform portion of said rod.

7. An elongated one-piece element for supporting the rotor casing of a gyroscope with respect to a fixed frame to provide a limited range of rotational movement of the casing and virtually infinite resistance to translational displacement of the casing, and the casing and frame each having means for clampingly receiving the respective ends of the element comprising a cylindrical rod having a plurality of longitudinally-extending, radial fins defining a plurality of longitudinally-extending cavities in the curved surface thereof, each cavity having a substantially sectoral transverse cross section which is uniform over a predetermined longitudinal extent of the rod and diminishes to zero at each end of the cavity.

8. A device in accordance with claim 7 wherein said rod is provided with an axial bore and the transverse cross section of the individual cavities is bounded by concentric arcs and straight angularly disposed sides.

References Cited in the file of this patent

UNITED STATES PATENTS

| | | |
|---|---|---|
| 1,880,982 | Rawlings | Oct. 4, 1932 |
| 1,880,992 | Sparling | Oct. 4, 1932 |
| 1,949,515 | Norton | Mar. 6, 1934 |
| 2,238,380 | Almen | Apr. 15, 1941 |
| 2,403,354 | Esdaile | July 2, 1946 |
| 2,409,178 | Allison et al. | Oct. 15, 1946 |
| 2,477,607 | Hungate | Aug. 2, 1949 |
| 2,480,783 | Sloan | Aug. 20, 1949 |
| 2,649,771 | Parks | Aug. 25, 1953 |
| 2,687,647 | Ashworth | Aug. 31, 1954 |

FOREIGN PATENTS

| | | |
|---|---|---|
| 756,731 | France | Sept. 25, 1923 |
| 245,416 | Switzerland | July 16, 1947 |